April 1, 1924.                G. S. BARKER                1,489,108
FEEDER
Filed March 24, 1923
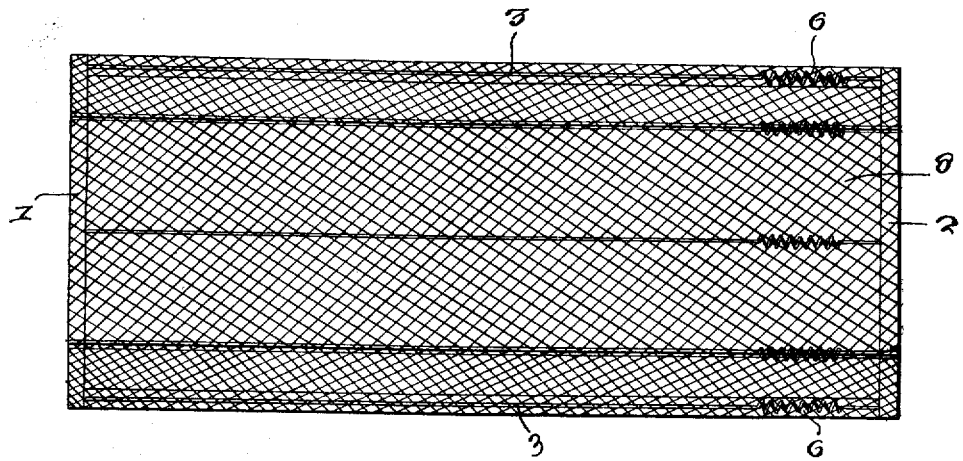
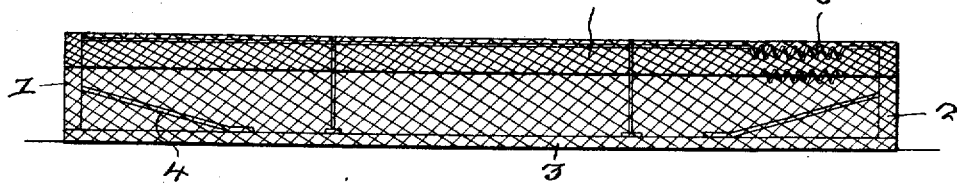
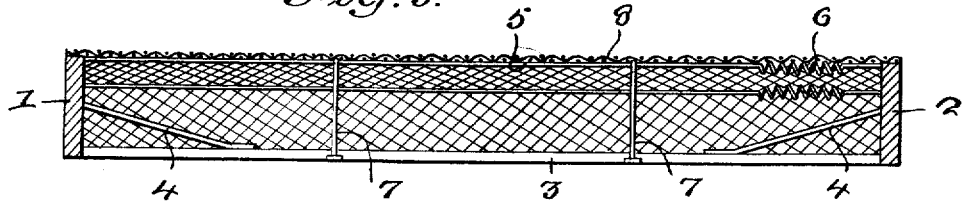
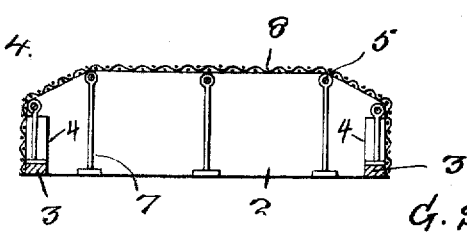
G. S. Barker INVENTOR
BY Victor J. Evans ATTORNEY Patented Apr. 1, 1924.

1,489,108

UNITED STATES PATENT OFFICE.

GURNEY S. BARKER, OF GREENSBORO, NORTH CAROLINA.

FEEDER.

Application filed March 24, 1923. Serial No. 627,404.

*To all whom it may concern:*

Be it known that I, GURNEY S. BARKER, a citizen of the United States, residing at Greensboro, in the county of Guilford and State of North Carolina, have invented new and useful Improvements in Feeders, of which the following is a specification.

The general object of this invention is to provide means for covering a patch of grass or the like to permit chickens or other poultry to reach the same but preventing them from totally destroying the patch.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the device.
Figure 2 is a side view.
Figure 3 is a longitudinal sectional view.
Figure 4 is a transverse sectional view.

In these views 1 and 2 indicate the end pieces which are connected together by the strips 3, braces 4 being provided for connecting the upper edges of the end pieces with said strips 3. Wires 5 have their ends connected with the end piece 1 and their other ends connected with the coil springs 6 which are connected with the end piece 2, thus the wires are kept taut. The wires are also provided with the T-shaped supports 7 which have eyes at their upper ends for receiving the wires, the cross pieces of the supports resting upon the ground. A sheet 8 of wire mesh is stretched over the device.

The device is placed over a patch of grass or the like to protect the same from being trampled down by large poultry, birds and animals and the meshes of the sheet 8 are made large enough to permit small chickens to have the advantage over the larger ones by being able to reach more of the grass.

This invention will enable the poultry to have a supply of green grass before them but will prevent the total destruction to the patch of green grass as is usually the case.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a pair of end pieces, strips connecting the ends of said end pieces together, wires stretched between the end pieces, each wire having a coil spring forming a part thereof and a sheet of wire gauze stretched over the device and having its meshes large enough to permit small poultry to place their heads therethrough to reach the material covered by the device.

2. A chick feeder including a substantially rectangular frame to be placed over the chick food, a sheet of reticulated material stretched over the frame and having openings of a size to permit the chicks to insert their heads to reach the food, longitudinal flexible elements extending longitudinally of the frame and upon which the reticulated material rests and contractile springs arranged intermediate the ends of the longitudinal elements to retain the latter taut and thereby hold the reticulated sheet against sagging.

3. A chick feeder including a substantially rectangular frame to be placed over the chick food, a sheet of reticulated material stretched over the frame and having openings of a size to permit the chicks to insert their heads to reach the food, longitudinal flexible elements extending longitudinally of the frame and upon which the reticulated material rests, contractile springs arranged intermediate the ends of the longitudinal elements to retain the latter taut and thereby hold the reticulated sheet against sagging and vertical rods arranged within the frame and engaged with the longitudinal elements to support the latter.

In testimony whereof I affix my signature.

GURNEY S. BARKER.